L. BRADLEY.
MEANS FOR ELECTRICAL TREATMENT OF GASES.
APPLICATION FILED JUNE 28, 1915.
1,333,790. Patented Mar. 16, 1920.
2 SHEETS—SHEET 2.
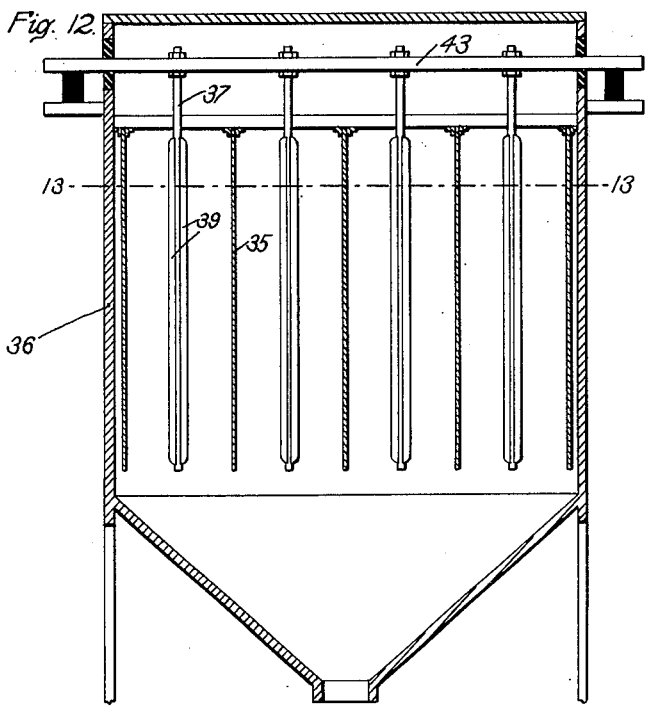
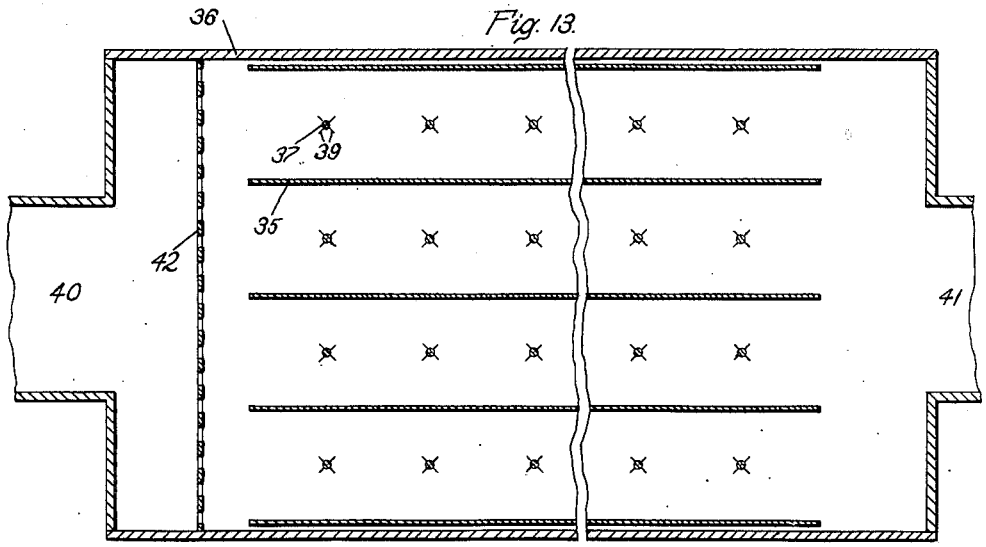
Inventor:
Linn Bradley.
Arthur P. Knight
Attorney.

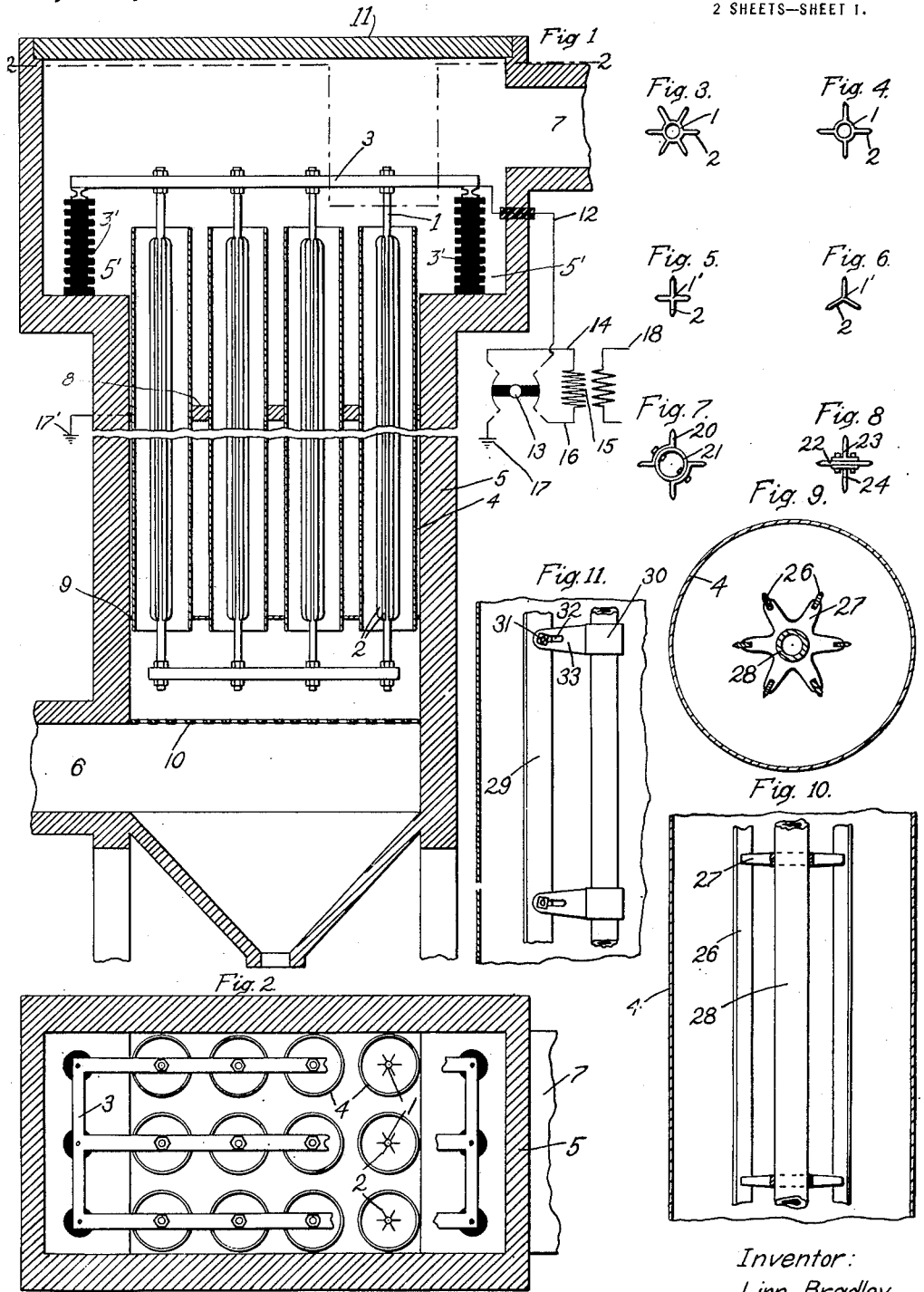

UNITED STATES PATENT OFFICE.

LINN BRADLEY, OF EAST ORANGE, NEW JERSEY, ASSIGNOR TO RESEARCH CORPORATION, OF NEW YORK, N. Y., A CORPORATION OF NEW YORK.

MEANS FOR ELECTRICAL TREATMENT OF GASES.

1,333,790.  Specification of Letters Patent.  Patented Mar. 16, 1920.

Application filed June 28, 1915. Serial No. 36,848.

*To all whom it may concern:*

Be it know that I, LINN BRADLEY, a citizen of the United States, residing at East Orange, in the county of Essex and State of New Jersey, have invented a new and useful Means for Electrical Treatment of Gases, of which the following is a specification.

The invention relates to means for electrical treatment of gases by producing electric discharge thereinto, either for the purpose of causing removal of suspended particles from such gases, or for other purposes; and the main object of the invention is to provide an improved construction of the electrode means for discharging the electricity into the gases.

Another object of the invention is to do away with the tensioning and retaining means such as are generally used in connection with fine wire and similar electrodes.

A further object of the invention is to provide a rigid electrode of such construction that it will have effective discharging action.

These objects I attain by constructing the discharge electrode with longitudinal ribs or flanges, which mutually brace and support one another to give a rigid construction of minimum weight, and which present longitudinal edges capable of producing effective discharge.

The accompanying drawings illustrate embodiments of my invention, and referring thereto:

Figure 1 is a vertical section of one form of the invention.

Fig. 2 is a section on line 2—2 in Fig. 1.

Fig. 3 is a transverse section of one of the discharge electrodes.

Figs. 4 to 8 are transverse sections showing other forms of the discharge electrode.

Fig. 9 is a horizontal and Fig. 10 a vertical section of a modified form of the invention.

Fig. 11 is a partial vertical section of another modification.

Fig. 12 is a vertical section of another form of the invention.

Fig. 13 is a section on line 13—13 in Fig. 12.

Referring to Figs. 1 and 2, each discharge electrode 1 is shown as a bar, provided with a plurality of flanges or longitudinal ribs 2. In the form shown in these figures, six flanges are provided on each electrode. The outer portions of these ribs may be tapered, rounded or otherwise made so as to present edges of sufficient sharpness or convexity to insure effective discharge under the potential difference and other conditions for which the apparatus is intended to be used. These edges are preferably plain smooth edges such as may be produced by rolling or drawing the electrode members, the potential differences used with the apparatus being preferably sufficient to produce the required amount of discharge from such smooth edges.

The electrodes 1 are shown as supported on an insulated support 3, and as extending vertically downward from such support and axially within pipes 4, constituting collecting or opposing electrodes. In case the apparatus is used for continuous treatment of gases, said pipes may be arranged vertically in a flue or stack 5, having an inlet 6 at its lower end and an outlet 7 at its upper end, so as to conduct the gas to and from the pipes. A partition 9 may extend across the flue 5, said pipes 4 extending through said partition, so that all the gas is caused to pass through the pipes. A baffle or distributing plate 10 is preferably provided below the pipes 4, so as to distribute the gas uniformly to all the pipes, said plate having perforations 10. The spaces between the pipes open into the header space at the upper end of the casing in flue 5 and the treated gas fills the chamber 5 and surrounds the pipes or flues 4 so as to tend to retain the heat in the gas flowing through the pipes or flues and thereby retain uniformity in temperature and in flow of gas in the several pipes or flues. This insulating effect is aided by constructing the casing itself with thick walls adapted to prevent passage of heat. Spacing means 8 may be provided to hold the pipes 4 in rigidly spaced relation. Casing 5 is expanded at its upper end to form an upper header, from which the outlet 7 extends laterally, this casing having a removable top or cover 11, to permit of access to the electrodes. This upper casing portion is also preferably provided with recesses 5' in which are mounted the insulators 3' for supporting the frame 3. By this construction the insulators 3' are surrounded by gas which is comparatively quiescent and which has already been cleaned by the electrical action, thereby minimizing the depositing of dust or fume on the insulators. The perforations in baffle or spreader plate 10 are of such size and distribution that the total area thereof is much smaller than the area of pipes or flues 4, so that the plate acts not only as a spreader, but also as a constricting means, giving a resistance to the flow of gas in such manner that any tendency of excess flow at any part of the system of flues will result in greater resistance at this part of the spreader plate which will therefore tend to equalize the flow through all the flues.

Electrodes 1 and 4 are connected to any suitable means for supplying high potential current thereto: for example, in case the apparatus is used for separation of suspended particles from gases, the support 3 may be connected to wire 12 leading to rectifier 13 which is connected by wire 14 to one side of the secondary winding of a step up transformer 15, the other side of said winding being connected by wire 16 to rectifier 13. Rectifier 13 is also provided with a ground connection 17, and the electrodes 4 are also grounded, as indicated at 17'. Rectifier 13 is operated in synchronism with the alternating current, so as to rectify the current passing to the electrodes 1 and 4. The primary winding of transformer 15 is connected to the alternating current supply circuit 18.

In the operation of the above described apparatus, the transformer 15 supplies to the leads 14 and 16, high tension alternating current which is rectified by the rectifier 13, so as to develop a suitable unidirectional high potential difference between the electrodes 1 and 4, and the construction and arrangement of the discharge electrodes are such that electrical discharge takes place from such discharge electrodes, and the gas passing through the pipes is thus subjected to the action of a unidirectional high tension discharge. This may be utilized for removing any particles suspended in the gas, or for otherwise acting on the gas, for example, for producing chemical reactions therein.

The above described construction, in addition to the mechanical advantages resulting from the rigidity of the discharge conductors or electrodes, also presents certain electrical advantages, in that the discharge electrode is subdivided into a plurality of conductor members (constituted by the flanges or ribs aforesaid) spaced in such manner that the electric field intensity adjacent to each member is reduced or modified by the influence of adjacent conductor members, so as to control the electric discharge according to the requirements of practice. Thus by providing a suitable number of flanges or ribs on the discharge electrode and by suitably spacing them from one another and from the opposing electrode, any required relation of discharging action and of electrostatic field strength may be obtained. This is of especial importance where the pipes or channels through which the gas is passed are made of comparatively large cross section, and it becomes necessary to provide for strong electrostatic field action, throughout such large channels, without unduly increasing the discharging action.

The discharge electrodes may have any desired number of flanges, provided they are spaced in such manner as to properly act as distinct discharge means. Thus, for example, three flanges may be provided as shown in Fig. 6, four flanges, as shown in Figs. 4 and 5, or six flanges, as shown in Figs. 2 and 3. The central portion or bar of the electrode may consist of a pipe as shown at 1 in Figs. 2, 3 and 4, or, as shown in 5 and 6 the flanges may be formed on a solid central portion 1', so as to form a flanged rail. In the above described figures the flanges are shown as integrally formed on the bar or pipe, but they may be formed as separate members 20 secured to a pipe 21, as shown in Fig. 7, or they may be formed as strips 22, 23 and 24 secured together to form a flanged rail, as shown in Fig. 8.

In case the pipe electrode 4 is of comparatively large diameter, the construction shown in Figs. 9 and 10 may be used, the discharge electrode comprising a plurality of longitudinal members or strips 26 mounted by spiders 27 on a central pipe 28. As shown in Fig. 11, the longitudinal strips 29 may be adjustably mounted on spiders 30, by means of bolts 31 engaging in slots 32 in arms 33 of said spiders, whereby the discharge edges of the strips 29 may be adjusted to the proper distance from the inner wall of the pipe electrode 4.

My invention is not limited to any special form of collecting electrodes, the discharge electrodes above described being applicable in connection with any suitable opposing electrodes. Thus, as shown in Figs. 12 and 13, the opposing electrodes 35 may consist of vertical plates mounted in a chamber 36, the discharge electrodes 37, provided with vertical ribs or flanges 39 being mounted vertically between the opposing electrodes, said electrodes 37 being hung from an insulated support 43. The chamber 36 is provided with inlet 40 and outlet 41, and is preferably provided with a perforated baffle plate 42 between the inlet and the electrodes, to distribute the incoming gas uniformly to the several passages or channels between the electrode plates 35.

I have not herein claimed that part of my invention which relates to the restriction of the flow of the gases to and through the flues, for the purpose of equalizing the distribution of the gases among the various pipes. This subject matter is claimed in my copending application Serial No. 105,015, filed June 21, 1916.

What I claim is:

1. An apparatus for electrical precipitation of suspended particles from gases including a discharge electrode provided with a plurality of longitudinally extending flanges.

2. An apparatus for electrical precipitation of suspended particles from gases including a rigid bar discharge electrode provided with a plurality of longitudinally extending flanges.

3. An apparatus for electrical precipitation of suspended particles from gases including an electrode consisting of a central supporting member and a plurality of lonigitudinally extending members, arranged around and supported on said central member and extending radially therefrom.

4. An apparatus for electrical precipitation of suspended particles from gases including a tubular electrode, and a discharge electrode extending axially within the tubular electrode and insulated therefrom, said discharge electrode consisting of a bar having longitudinal flanges.

5. An apparatus for electrical precipitation of suspended particles from gases including a discharge electrode comprising a central supporting portion, and a plurality of separate discharge flanges arranged about and supported on said central supporting portion.

6. An apparatus for electrical precipitation of suspended particles from gases including a discharge electrode comprising members connected in angular rigid relation to mutually brace one another.

7. An apparatus for electrical precipitation of suspended particles from gases including a discharge electrode comprising a central support and a plurality of electrode members extending from said support and parallel with the axis thereof.

8. An apparatus for electrical treatment of gases, comprising elongated discharge electrode means and opposing electrode means and an insulated support mounted independently of said opposing electrode means, said discharge electrode means being rigidly mounted on said insulating support so as to be supported independently of said opposing electrode means, and being provided with longitudinal ribs for increasing its discharging action and for increasing its rigidity.

9. An apparatus for electrical treatment of gases comprising a plurality of elongated discharge electrodes, and opposing electrodes mounted opposite said discharge electrodes and an insulated frame, said discharge electrodes being mounted on said frame so as to be supported independently of said opposing electrodes and extending parallel to the surfaces of said opposing electrodes in spaced relation thereto and said discharge electrodes being provided with longitudinal ribs for increasing the rigidity thereof and facilitating discharge therefrom.

10. An apparatus for electrical treatment of gases comprising a plurality of rigid, vertically arranged, discharge electrodes, a plurality of opposing electrodes, an insulated frame above said opposing electrodes and an insulated frame below said opposing electrodes, said discharge electrodes being connected at their upper and lower ends respectively to said insulated frames above and below said opposing electrodes.

11. An apparatus for electrical precipitation from fluid or gaseous streams comprising a flue constituting a receiving electrode, and a rigid discharge electrode in said flue provided with a plurality of parallel discharge edges continuous in length.

12. In an apparatus for electrical treatment of gases, discharge electrodes and opposing electrodes, all of said electrodes being vertically arranged, an insulated frame over the opposing electrodes, said discharge electrodes being formed as rigid members mounted on said insulated frame, and an insulated spacing frame rigidly mounted on the said discharge electrodes below said opposing electrodes.

13. In an apparatus for electrical treatment of gases, a discharge electrode, an opposing electrode, and an insulated frame, said discharge electrode comprising a longitudinal member rigidly mounted on said frame and extending alongside said opposing electrode, and a discharge member adjustably mounted on said longitudinal member so as to be adjustable toward or from the opposing electrode.

14. In an apparatus for electrical treatment of gases, the combination of discharge electrodes, opposing electrodes, and a frame insulated from the opposing electrodes, said discharge electrodes being formed as elongated rigid members mounted on said frame and having longitudinal ribs rounded at their ends.

15. In an apparatus for electrical treatment of gases, the combination of discharge electrodes, opposing electrodes, and a frame insulated from the opposing electrodes, said discharge electrodes being formed as elongated rigid members mounted on said frame and having longitudinal ribs rounded at their ends, and said opposing electrodes extending beyond the ribbed portions of said discharge electrodes.

16. An apparatus for electrical precipitation of particles from gases including a rigid bar having a plurality of radial ribs formed integrally thereon, said bar extending beyond the ends of said ribs for attachment to a support.

17. An apparatus for electrical precipitation of suspended particles from gases including a chamber provided with an inlet at its lower portion and an outlet at its upper portion and with recesses at its upper portion out of the current of gas passing through the chamber, insulators in said recesses, an insulated frame mounted in said recesses and discharge electrodes mounted on said insulated frame.

18. An apparatus for electrical precipitation of suspended particles from gases including a flue constituting a receiving electrode, and a discharge electrode in said flue provided with a plurality of longitudinally extending flanges, the zone of ionization in said flue being free from obstructions to the flow of gas therethrough.

19. In an apparatus for electrical precipitation of suspended particles from gases, a discharge electrode provided with a plurality of longitudinally extending flanges, said flanges being adjustable laterally of said discharge electrode.

20. In an apparatus for electrical precipitation of suspended particles from gases, a tubular electrode, a discharge electrode extending axially within the tubular electrode, flanges longitudinally disposed on said discharge electrode, and means for adjusting said flanges radially.

21. That improvement in the art of producing electrical precipitation from fluid or gaseous streams which consists in establishing a plurality of continuous parallel ionization zones in the flow path of a stream, said zones extending lengthwise in the direction of length of the stream flow path, said zones having an effective diameter substantially equal to that of the flow path.

22. In the art of producing electrical precipitation of particles from fluid or gaseous streams, the combination of opposing electrode systems including collecting and discharge electrodes, said collecting electrodes being hollow and of circular cross section, and said discharge electrodes being of rigid construction and having discharge edges, at least one of which extends lengthwise of the electrode and is adapted to cause a radial discharge at all points in the length of said edge.

In testimony whereof I have hereunto set my hand, at East Orange, New Jersey, this 26th day of June 1915.

LINN BRADLEY.